March 12, 1940.   H. O. HEM   2,193,628
TESTING DEVICE
Filed Oct. 29, 1938   3 Sheets-Sheet 1
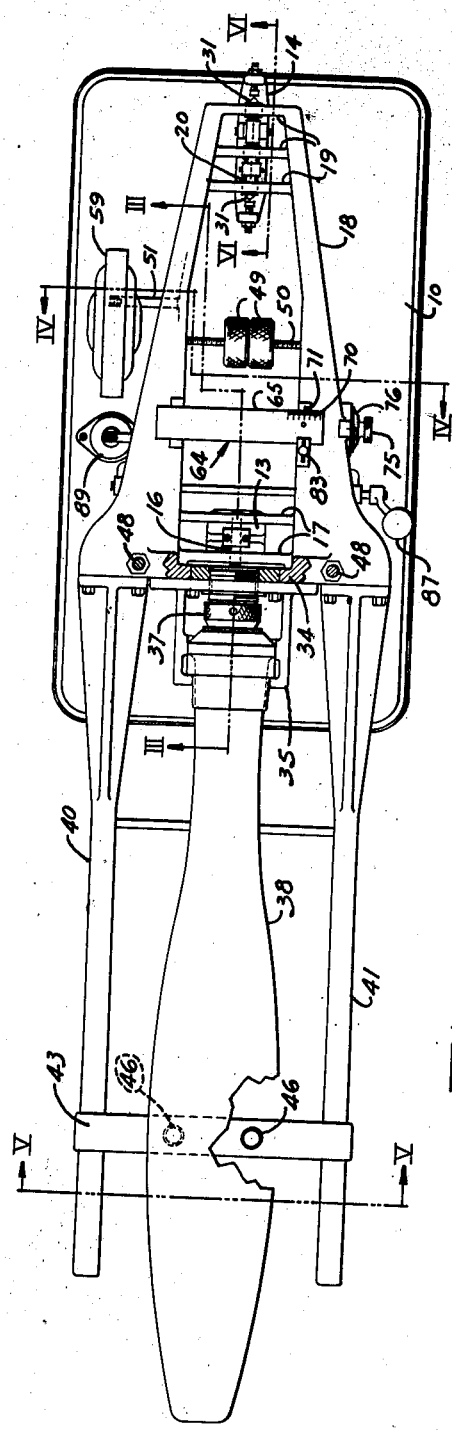
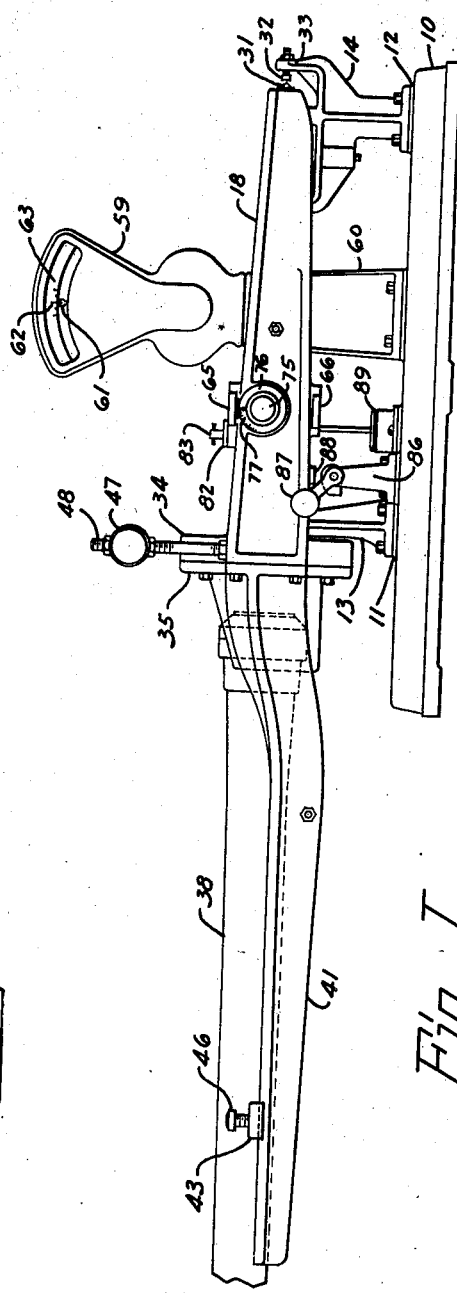
Halvor O. Hem
INVENTOR
BY Marshall & Marshall
ATTORNEYS

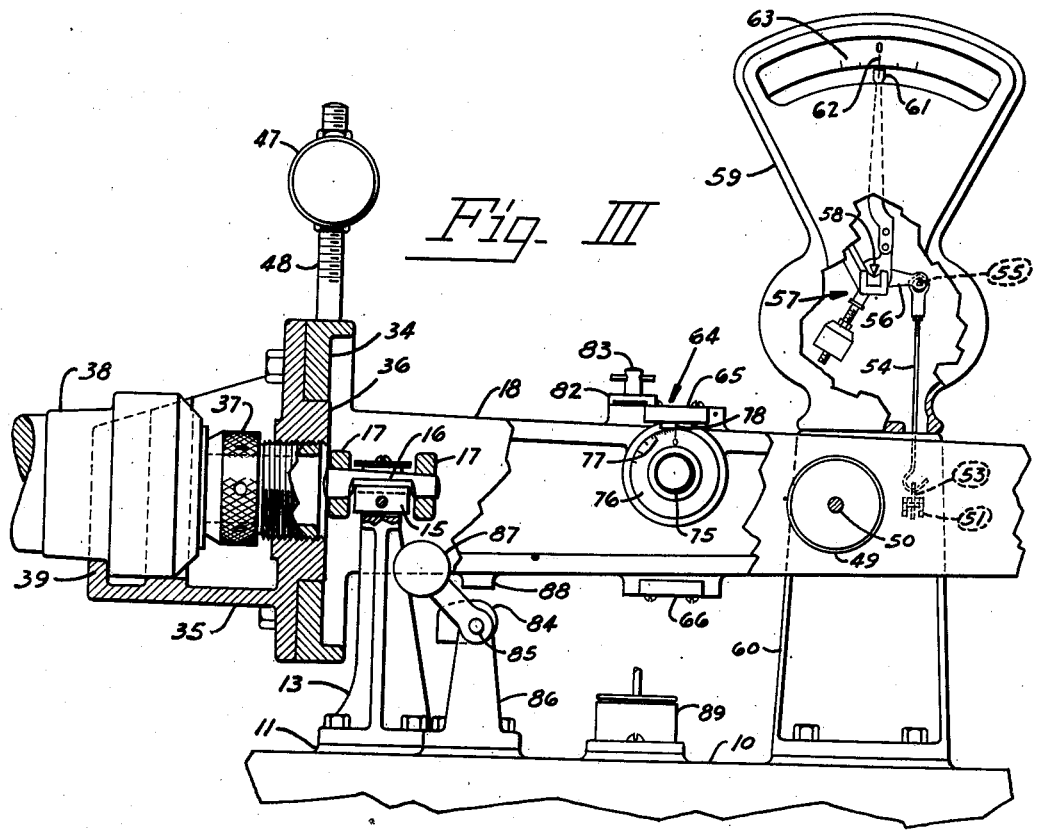
March 12, 1940.  H. O. HEM  2,193,628
TESTING DEVICE
Filed Oct. 29, 1938  3 Sheets-Sheet 2
Fig. III
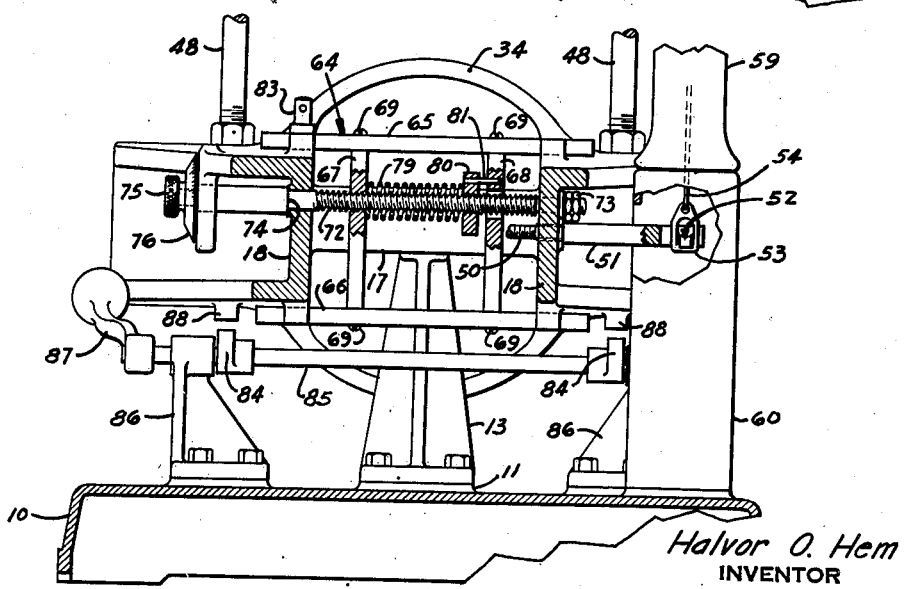
Fig. IV
Halvor O. Hem
INVENTOR
BY Marshall & Marshall
ATTORNEYS March 12, 1940.  H. O. HEM  2,193,628
TESTING DEVICE
Filed Oct. 29, 1938  3 Sheets-Sheet 3
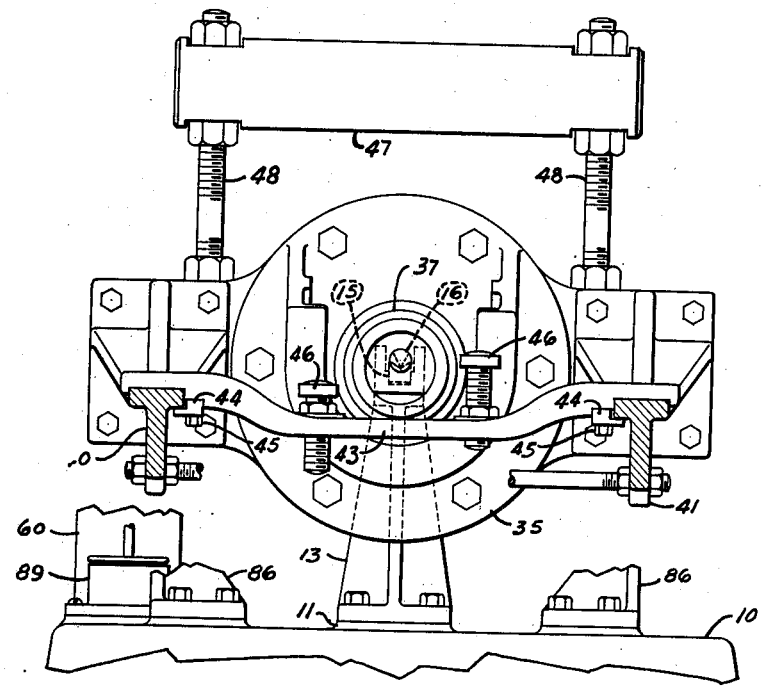
Fig. V
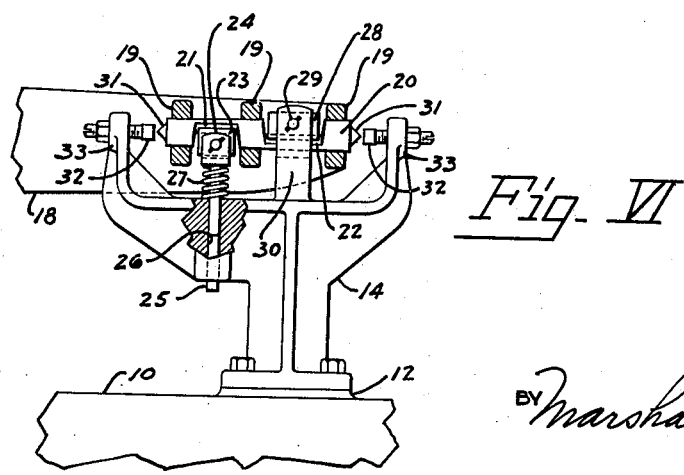
Fig. VI
Halvor O. Hem
INVENTOR
BY Marshall & Marshall
ATTORNEYS Patented Mar. 12, 1940

2,193,628

UNITED STATES PATENT OFFICE 2,193,628

TESTING DEVICE

Halvor O. Hem, Toledo, Ohio, assignor to Toledo Scale Manufacturing Company, Toledo, Ohio, a corporation of New Jersey Application October 29, 1938, Serial No. 237,675

9 Claims. (Cl. 73—51)

This invention relates generally to testing devices, and more particularly to a device for determining a static moment of a blade for propellers such as used on aircraft or other devices employing air screws.

It has heretofore been customary to reproduce propeller blades in conformity with a master. Such master blades, however, must be permanently retained for reference purposes and furthermore a master blade must be supplied to each source of supply of the blade. The wastefulness of this method in both time and money is obvious.

The principal object of this invention is a device for quantitatively determining a moment of a propeller blade.

Another object is the provision of an improved device whereby propeller blades may be given the same definite quantitative characteristics without comparison with a master blade.

Still another object is the provision of improved means for determining a moment of a propeller blade in definite units, such as inch-pounds; and, A still further object is the provision of improved means for determining the transverse static moment of a propeller blade.

These, and other objects and advantages will be apparent from the following description in which reference is had to the accompanying drawings, illustrating a preferred embodiment of the invention and in which similar reference numerals refer to similar parts throughout the several views.

Referring to the drawings:

Fig. I is a front elevational view of the device embodying the invention.

Fig. II is a plan view thereof.

Fig. III is an enlarged fragmentary longitudinal sectional view substantially along the line III—III of Fig. II.

Fig. IV is an enlarged transverse sectional view substantially along the line IV—IV of Fig. II.

Fig. V is an enlarged transverse sectional view as seen from the other end of the device substantially from along the line V—V of Fig. II; and, Fig. VI is an enlarged fragmentary elevational view and showing in particular one of the fulcrum stands.

Referring to the drawings in detail:

The device comprises a rigid base or frame 10 having a plurality of machined pads 11 and 12 on its upper surface. These pads are spaced substantially along the longitudinal center line, and securely bolted thereto are upwardly extending fulcrum stands 13 and 14. The upper end of the fulcrum stand 13 is bifurcated (Fig. III) and a bearing 15 is seated in the bifurcation for the reception of a pivot 16 which spans a bifurcated portion of a transverse arm 17 of a beam 18. The beam 18 has a general frusto-triangular shape and its narrow portion is connected by three transversely extending webs 19 which are spaced from each other and support a pivot 20. This pivot 20 is provided with knife edges 21 and 22 (Fig. VI). The knife edge 21 faces in the same direction as the knife edge of the pivot 16, with which it is collinear, and rests in a bearing 23 rockably mounted in a holder 24 on the end of a stem 25 which freely enters into a bore 26 in the fulcrum stand 14.

A helical spring 27, which is circumjacently mounted on the stem 25 between the bottom of the holder 24 and a web of the fulcrum bracket 14, serves to press the beam 18 upwardly until the knife edge 22, which faces in the direction opposed to the knife edge 21, is firmly seated in the V of a bearing 28 which is rockably mounted on a pin 29 projecting through upwardly extending arms 30 of the fulcrum stand 14. The pivot 20, in which the knife edges 21 and 22 are machined, has a conical body which is driven into taper-reamed holes in the webs 19 and is provided with conical thrust points 31 at each end which are adapted to be engaged by flat ends of adjustable thrusts 32 projecting through upwardly extending arms 33 of the fulcrum stand 14. This thrust arrangement is for the purpose of limiting end play of the beam 18 upon its bearings. The opposite ends of the longitudinally extending arms of the beam 18 are integral with a vertically positioned substantially circular flange 34 whose outer face is machined and which is adapted to have a propeller shank receiver 35 bolted thereto. The end of the receiver 35, which is bolted to the flanged arm, is also substantially circular in shape and is provided with a centrally located circular boss-like projection 36 which enters into a horizontally extending bore in the flange 34. Adjustably mounted in the boss-like projection is a threaded clamping member 37 having a flat face which is adapted to engage the butt of the shank of a propeller blade 38 when mounted in the receiver 35. The portion of the receiver 35 in which the shank rests is made to closely engage the contour of the lower half of the shank in such a manner that the propeller is lowered vertically when in a horizontal position and a flange 39 is adapted to engage a shoulder on the shank of the propeller and coopearte with the threaded clamping member to securely hold the propeller in horizontally extended position on the beam 18. Since all of the weight of the propeller 38 is on one side of the pivot 16 and overbalances the beam 18, the reason for the two opposed knife edges of the pivot 20 on the other end of the beam becomes apparent, as also the reason for the spring 27 which surrounds the stem 25 of the bearing 23. It is of the greatest importance that the receiver 35, in which the shank of the propeller is clamped, be made with an open top and an open end so that the propeller may be lowered vertically. These propellers have considerable weight and when any other holding means are provided except one in which the propeller is lowered vertically the thrusts 31 of the pivot 20 are bound to be injured by any horizontally directed force which naturally would result in loss of sensitivity of the device.

For the purpose of supporting the other end of the propeller blade, horizontally extending arms 40 and 41 are bolted to the flange 34 of the beam 18 which are adapted to have a cross arm 43 adjustably fastened thereto by means of clips 44 and bolts 45 (Figs. II and V). This cross arm 43 is provided with adjustable bolt-like members 46 which are adjusted to engage the lower face of the propeller blade when it is clamped in the receiver 35 and thus relieve any strain on the receiver.

Beam balancing means comprising a cylindrical weight 47, mounted on vertically extending rods 48 studded in the flange 34, is provided to neutralize any pendulum effect of the beam assembly. Balance weights 49, which are mounted on a threaded rod 50 extending between the longitudinal arms, are provided for establishing the static balance of the beam assembly about its pivotal axis.

So that the condition of balance of the beam, as well as the beam and a propeller blade secured thereto, may be readily determined, an arm 51 studded into one of the longitudinal extending arms of the beam 18 (Fig. IV) is provided with a pivot 52 engaging a stirrup 53 suspended by means of a connecting member 54 from a pivot 55 fixed in an arm 56 of a pendulum 57. This pendulum 57 is mounted, by means of a pivot 58, upon suitable bearings in the interior of a housing 59 which is mounted on a frame 60 on the base 10 and an upwardly directed indicator 61 is adapted to cooperate with indicia 62 on a chart 63 in the well known manner.

To establish the transverse static moment of the propeller blade quantitatively in inch-pounds, or other definite units, such as kilogram meter units, a micrometer poise 64 is provided. This micrometer poise 64 (Fig. IV) comprises a top member 65 and a bottom member 66 seated respectively in machined ways on the top and bottom of the longitudinal arms of this beam. These members 65 and 66 are connected by vertical plates 67 and 68 and are assembled into a unit by means of screws 69 so that the assembled unit may slide freely in a direction transverse to the pivotal axis of the beam. The weight of this frame-like poise is then carefully adjusted by removing metal by drilling holes in the member 66. The plate 65 is provided with a series 70 of indicia and a line 71 is engraved on a machined pad on the beam 18 for cooperation with the indicia to serve as a reading index. In this example, it is assumed that each of the graduations in the series 70 represents one inch-pound. To actuate this poise, a micrometer screw 72 freely extends through bores in the longitudinally extending arms of the beam and through a bore in the vertical plate 68 of the poise, but is threaded through a bore in the vertical plate 67. The screw 72 is held against endwise movement by nuts 73 which are threaded on an end of the screw projecting beyond one of the longitudinal arms of the beam, and a shoulder 74 serves as a locating stop against a machined boss on the other longitudinal arm. The micrometer screw 72, so that it may be readily turned, has pinned to its other end a hand knob 75 and a graduated dial 76 which is integral with the knob. A series 77 of graduations marked on this dial cooperates with an index 78, engraved on a polished spot on the beam 18 immediately in back of the dial 76. It will be seen that when the screw 72 is turned the poise 64 is thus constrained to move transversely of the pivotal axis of the beam 18 and the extent of its movement is indicated conjointly by the series of graduations 70 and series 77.

Since a propeller blade may be heavy on either side of its longitudinal axis the center of mass of the poise 64 in its neutral position is directly on the longitudinal axis of the beam 18 and it will be noted that the zero indicium in the series 70 on the plate 65 is in the center so that it may indicate an out-of-balance condition of the propeller blade on either side of its longitudinal axis with equal facility.

As it is necessary to eliminate any possibility of lost motion between the screw 72 and the poise 64, a helical spring 79 is circumjacently mounted upon the screw 72 between the vertically extending plate 67 and a nut 80, which is threaded upon the screw 72 closely adjacent the plate 68 of the poise. This nut 80 is prevented from turning with the screw by the action of a pin 81 which is studded into the nut and projects freely into a hole drilled in the plate 68. The bias of this spring 79 thus urges the poise in one direction so that the same sides of the threads on the screw and in the plate 67 are always in engagement regardless in what direction the screw is turned. To lock this poise 64 in adjusted position a clip 82 is provided, which is adapted to clamp the upper poise plate 65 with the aid of a screw 83.

Means are also provided to lock the beam 18 so that the propeller 38 may be inserted and removed from the receiver, or work performed upon the blade without injury to the bearings. These locking means comprise a pair of cams 84 keyed to a shaft 85 which is fulcrumed in brackets 86 mounted upon the base 10. A portion of the shaft 85, which projects beyond the bracket 86 in the front of the device, is provided with a crank handle 87. The cams 84 are located on the shaft 85 so that when the handle 87 is turned in a clockwise direction portions thereof are adapted to slide beneath machined bosses 88 on each of the longitudinally extending arms of the beam 18 and thus prevent oscillation of the beam. To dampen oscillations of the beam a dashpot 89 is provided which is seated in the base 10 whose plunger is connected to the beam in the customary manner.

To condition the device for determining the transverse static moment of a propeller blade about its longitudinal axis, the first step in the operation is to attach a receiver 35 which has the proper configuration for the shank of the type of propeller to be tested, the handle 87 is turned in anticlockwise direction and the beam released for oscillation. The balance weights 49 are then adjusted upon the screw 50 until, through the means described, the indicator 61 points to the zero indicium in the series 62 on the chart 63. It must be understood, of course, that when this balancing operation is performed the zero indicium in the series 70 of the poise 64 is in registration with the index 71. When this balance has been accurately established the beam is again locked against oscillation on its pivots by turning the crank handle 87 in a clockwise direction.

A propeller blade, whose transverse static moment is to be determined, is held horizontally with its shank over the upper open end of the receiver 35 and then is carefully lowered vertically until its shank rests in the receiver. Care must be taken that in lowering this blade the horizontal condition of the blade be not disturbed. The clamping member 37 is then firmly turned against the butt of the shank of this propeller so that its shoulder is clamped firmly against the flange 39. The stops 46 in the cross arm 43 are then adjusted so that they just engage the surface of the blade and relieve any strain on the receiver 35 due to the overhanging weight.

The beam 18 is then unlocked by turning the handle 87 in the anticlockwise direction and if one of the edges of the blade 38 is heavier it will rock the beam about its pivotal axis and the indicator actuating arm 51, partaking of the movement of the beam, increases or decreases its "pull" on the pendulum and this unbalanced condition is indicated by the cooperation of the indicator 61 and the chart 63.

According to the invention the amount of such transverse moment of the propeller is quantitatively determined by the poise 64. Assuming that the poise 64 is unlocked, the operator slowly turns the hand knob 75 so that the poise is moved away from its neutral position on the longitudinal axis of the beam towards the side which is opposite the heavy edge of the blade until the indicator 61 returns into registration with the zero indicium 62 on the chart 63. The number of inch-pounds indicated by the graduations of the series 70 on the upper plate 65 of the poise and the fractional inch-pounds indicated by the series 77 on the dial 76 are added, the sum being the value of the transverse moment. The blade may then be further processed, or, if the moment is within the predetermined tolerance, it may be recorded together with the serial number of the blade so that another blade may be given the same moment to replace the original blade when the occasion arises.

The embodiment of the invention herein shown and described is to be regarded as illustrative only, and it is to be understood that the invention is susceptible to variation, modification and change within the spirit and scope of the subjoined claims.

Having described the invention, I claim:

1. In a device for determining the transverse static moment of a propeller blade, in combination, a base, a beam comprising spaced arms, cross members connecting said arms, a plurality of knife edged pivots mounted collinearly in said cross members for oscillatably supporting said beam upon said base, means secured to said beam between said spaced arms for supporting one end of a propeller blade so that its longitudinal axis is collinear with said pivots and its weight disposed entirely to one side of said pivots, one of said plurality of pivots having its knife edge turned in a direction opposed to the knife edge of another of said pivots and being adapted to counteract such overhanging weight of said propeller blade and a plurality of bearings cooperating with said pivots, one of said bearings being spring urged into engagement with its pivot.

2. In a device of the class described, in combination, a base, a beam, fulcrum pivots secured to said beam along its longitudinal axis, means supported by said base for supporting said fulcrum pivots, a receiver secured to said beam with its axis collinear with the axis of said beam for the reception of the shank of a propeller blade, said beam having attached thereto spaced arms adapted to extend on each side of said propeller blade when secured in said receiver, an adjustable member spanning said spaced arms and having adjustable means adapted to cooperate with said receiver in supporting said propeller blade on said beam and means adapted for engagement with said beam on each side of its longitudinal axis for holding said beam in inoperative condition.

3. In a device of the class described, in combination, a base, a beam, fulcrum pivots secured to said beam along its longitudinal axis, means supported by said base for supporting said fulcrum pivots, a receiver secured to said beam with its axis collinear with the axis of said beam for the reception of the shank of a propeller blade, said beam having attached thereto spaced arms adapted to extend on each side of said propeller blade when secured in said receiver and an adjustable member spanning said spaced arms and having adjustable means adapted to cooperate with said receiver in supporting said propeller blade on said beam.

4. In a device of the class described, in combination, a base, a bifurcated beam, pivots secured to said beam in its longitudinal axis, fulcrum stands secured to said base for supporting said pivots, a receiver having an open top and a substantially open end secured to said beam for the reception of a propeller blade, said receiver being adapted to support said propeller blade with its longitudinal axis collinear with the longitudinal axis of said beam and a counterbalancing poise fixed on said beam for indicating quantitatively an amount of unbalance of such propeller blade about its longitudinal axis, said poise being adapted to span said arms of said beam and having its center of gravity normally located on the longitudinal axis and bearing a series of graduations adapted to indicate its counterbalancing effect on either side of said longitudinal axis.

5. In a device of the class described, in combination, a base, a bifurcated beam, pivots secured to said beam in its longitudinal axis, fulcrum stands secured to said base for supporting said pivots, a receiver having an open top and a substantially open end secured to said beam for the reception of a propeller blade, said receiver being adapted to support said propeller blade with its longitudinal axis collinear with the longitudinal axis of said beam, a counterbalancing poise fixed on said beam for indicating quantitatively an amount of unbalance of such propeller blade about its longitudinal axis and a pendulated indicator cooperating with said beam for automatically indicating the condition of balance of said beam and of said propeller blade.

6. In a device of the class described, in combination, a base, a beam, pivots secured to said beam in its longitudinal axis, fulcrum stands secured to said base for supporting said pivots, a receiver having an open top and a substantially open end secured to said beam for the reception of a propeller blade, said receiver being adapted to support said propeller blade with its longitudinal axis collinear with the longitudinal axis of said beam, means operatively connected to said beam for indicating the condition of unbalance of said propeller blade about its longitudinal axis and means for locking said beam.

7. In a device of the class described, in combination, a base, a bifurcated beam, pivots secured to said beam in its longitudinal axis, fulcrum stands secured to said base for supporting said pivots, a receiver having an open top and a substantially open end secured to said beam for the reception of a propeller blade, said receiver being adapted to support said propeller blade with its longitudinal axis collinear with the longitudinal axis of said beam and a counterbalancing poise movably mounted on said beam for indicating quantitatively an amount of unbalance of such propeller blade about its longitudinal axis.

8. In a device of the class described, in combination, a base, beam supports mounted on said base, a beam, pivots in said beam for oscillatably mounting said beam upon said supports, means for supporting a propeller blade with its longitudinal axis collinear with the oscillating axis of said beam and means for automatically indicating a condition of unbalance of said propeller blade, said means for supporting such propeller blade comprising a receiver having a bottom portion shaped to closely engage the contour of a portion of such blade, an open top, a flange substantially adjacent an open end and an adjustable means for clamping such blade against said flange.

9. In a device of the class described, in combination, a base, beam supports mounted on said base, a beam, pivots in said beam for oscillatably mounting said beam upon said supports, means for supporting a propeller blade with its longitudinal axis collinear with the oscillating axis of said beam and means for automatically indicating a condition of unbalance of said propeller blade, said means for supporting such propeller blade comprising a receiver adapted to receive such blade when held horizontal and lowered vertically.

HALVOR O. HEM.